US012789755B2

(12) United States Patent
Park et al.

(10) Patent No.: US 12,789,755 B2
(45) Date of Patent: Nov. 10, 2026

(54) LiDAR-INTEGRATED SPRAY NOZZLE

(71) Applicants: HYUNDAI MOTOR COMPANY, Seoul (KR); KIA CORPORATION, Seoul (KR); NIFCO KOREA Inc., Asan-si (KR); DY AUTO Corporation, Asan-si (KR)

(72) Inventors: Jong Min Park, Hwaseong-si (KR); Young Joo Cho, Hwaseong-si (KR); Kyeong Min Park, Asan-si (KR); Jae Hyoung Kim, Asan-si (KR); Sin Won Kang, Asan-si (KR); Gyu Seon Lee, Asan-si (KR)

(73) Assignees: HYUNDAI MOTOR COMPANY, Seoul (KR); KIA CORPORATION, Seoul (KR); NIFCO KOREA Inc., Asan-si (KR); DY AUTO Corporation, Asan-si (KR)

( * ) Notice: Subject to any disclaimer, the term of this patent is extended or adjusted under 35 U.S.C. 154(b) by 206 days.

(21) Appl. No.: 18/962,932

(22) Filed: Nov. 27, 2024

(65) Prior Publication Data

US 2026/0021793 A1 Jan. 22, 2026

(30) Foreign Application Priority Data

Jul. 16, 2024 (KR) ........................ 10-2024-0093419

(51) Int. Cl.

| | |
|---|---|
| ***B60S 1/56*** | (2006.01) |
| ***B60S 1/48*** | (2006.01) |
| ***B60S 1/52*** | (2006.01) |
| ***G01S 7/481*** | (2006.01) |
| ***G01S 7/497*** | (2006.01) |
| ***G01S 17/931*** | (2020.01) |

(52) U.S. Cl.

CPC ................. *B60S 1/56* (2013.01); *B60S 1/485* (2013.01); *B60S 1/52* (2013.01); *G01S 7/4813* (2013.01); *G01S 7/497* (2013.01); *G01S 17/931* (2020.01); *G01S 2007/4977* (2013.01)

(58) Field of Classification Search

CPC .... B60S 1/56; B60S 1/485; B60S 1/52; G01S 17/931; G01S 7/4813; G01S 7/497; G01S 2007/4977

USPC ........................................................ 134/99.1

See application file for complete search history.

(56) References Cited

U.S. PATENT DOCUMENTS

2018/0201232 A1 * 7/2018 Ringler ..................... B08B 3/02

FOREIGN PATENT DOCUMENTS

KR 20180136981 A 12/2018

* cited by examiner

*Primary Examiner* — Tinsae B Ayalew

(74) *Attorney, Agent, or Firm* — MCDONNELL BOEHNEN HULBERT & BERGHOFF LLP

(57) ABSTRACT

A light detection and ranging (LiDAR)-integrated spray nozzle includes: a LiDAR; a housing spaced apart from an outer peripheral surface of the LiDAR and including a guide groove and at least two flow path grooves formed therein; a nozzle cover configured to surround an upper surface of the housing and including a protrusion portion inserted into the guide groove; and a nozzle tip disposed at a fluid discharge port provided at the housing. When the protrusion portion is inserted into the guide groove to couple the nozzle cover to the housing, the at least two flow path grooves are sealed to form flow paths.

11 Claims, 8 Drawing Sheets

< SECTION B-B >

< SECTION A-A >

< SECTION B-B >

< TOP VIEW_Without covwe >

LiDAR-INTEGRATED SPRAY NOZZLE

CROSS-REFERENCE TO RELATED APPLICATION

This application claims under 35 U.S.C. § 119(a) the benefit of priority to Korean Patent Application No. 10-2024-0093419, filed on Jul. 16, 2024, the entire contents of which are incorporated herein by reference.

BACKGROUND

(a) Technical Field

The present disclosure relates to a light detection and ranging (LiDAR)-integrated spray nozzle. In particular, it relates to a LiDAR-integrated spray nozzle configured to spray washer fluid and air at the same time in order to efficiently clean sensors mounted in a vehicle.

(b) Background Art

Recently, driver assistance systems for assisting drivers in vehicles have been applied to vehicles to ensure safe driving in various traveling situations. In addition to the driver assistance systems, research and development has been actively conducted on autonomous vehicles capable of autonomously traveling without intervention by a driver. Such a driver assistance system or an autonomous vehicle requires various types of sensors capable of detecting the environment around the vehicle in various ways.

Examples of sensors mounted in vehicles may include a radio detection and ranging (radar), a LiDAR, a camera, and the like. Because these sensors are mounted outside the vehicles, sensing portions thereof may be easily contaminated by rainwater, snow, foreign substances such as dust, or the like depending on traveling conditions such as weather, the state of roads, and surrounding environment. If the sensors are contaminated, the performance thereof may deteriorate. Therefore, a certain level or higher of cleanliness is desired to be maintained in order to ensure the performance of the sensors. To this end, vehicles are equipped with a contamination detecting device configured to detect contamination of sensors and a sensor cleaning system configured to clean the sensors in response to detection of contamination of sensing portions of the sensors.

A conventional cleaning system using washer fluid has the following problem. When the washer fluid is sprayed at low temperature, the washer fluid discharge pressure is reduced due to increase in viscosity of the washer fluid, leading to deterioration in cleaning performance. In order to solve this problem, a cleaning system employing an air nozzle as well as a washer nozzle for spraying washer fluid to remove foreign substances is being developed.

The above information disclosed in this Background section is only to enhance understanding of the background of the disclosure. Therefore, the Background section may contain information that does not form the related art that is already known in this country to a person of ordinary skill in the art.

SUMMARY

The present disclosure has been made in an effort to solve the above-described problems associated with the related art, and it is an object of the present disclosure to provide a light detection and ranging (LiDAR)-integrated spray nozzle capable of efficiently cleaning the LiDAR.

In particular, it is an object of the present disclosure to provide a LiDAR-integrated spray nozzle in which a washer flow path and an air flow path are provided independently of each other and an end of the washer flow path and an end of the air flow path are connected to a nozzle tip to spray washer fluid and air at the same time. As a result, the LiDAR-integrated spray nozzle efficiently removes foreign substances from the LiDAR.

The objects of the present disclosure are not limited to the above-mentioned objects, and other objects not mentioned herein should be understood from the following description, and should become apparent with reference to the embodiments of the present disclosure. In addition, the objects of the present disclosure can be accomplished by the components described in the appended claims and combinations thereof.

In one aspect, the present disclosure provides a light detection and ranging (LiDAR)-integrated spray nozzle including: a column-type sensor; and a housing spaced apart from a sensing portion of the column-type sensor and including a guide groove and at least two flow path grooves formed therein. The LiDAR-integrated spray nozzle may also include: a nozzle cover configured to surround an upper surface of the housing and include a protrusion portion inserted into the guide groove; and a nozzle tip disposed at a fluid discharge port provided at the housing. When the protrusion portion is inserted into the guide groove to couple the nozzle cover to the housing, the at least two flow path grooves are sealed to form flow paths.

In an embodiment, the guide groove may be configured to surround the at least two flow path grooves, and the protrusion portion may be located at the nozzle cover so as to correspond to the guide groove.

In another embodiment, the LiDAR-integrated spray nozzle may include a welding groove formed in the guide groove to allow a part of the protrusion portion to be inserted thereinto and a welding ridge formed on a lower surface of the protrusion portion to be inserted into the welding groove in the guide groove.

In still another embodiment, the protrusion portion may include a first protrusion located on a lower surface of the nozzle cover at a position adjacent to the LiDAR. Additionally, the protrusion portion may include a second protrusion spaced a predetermined distance from the first protrusion, and a third protrusion spaced a predetermined distance from the second protrusion.

In yet another embodiment, the at least two flow path grooves may include a first flow path groove located between the first protrusion and the second protrusion, and a second flow path groove located between the second protrusion and the third protrusion.

In still yet another embodiment, the nozzle cover may include a washer fluid injection port configured to allow washer fluid to be introduced thereinto and an air injection port configured to allow air to be introduced thereinto.

In a further embodiment, the first flow path groove may be configured to be in fluid connection with the washer fluid injection port, and the second flow path groove may configured to be in fluid connection with the air injection port.

In another further embodiment, the LiDAR-integrated spray nozzle may include two air discharge ports located in the second flow path groove and a washer fluid discharge port located in the first flow path groove. The washer fluid discharge port may be located on an imaginary line interconnecting the two air discharge ports.

In still another further embodiment, the washer fluid discharge port may be located in a protruding portion extending outwardly from the first flow path groove.

In yet another further embodiment, the two air discharge ports and the washer fluid discharge port may be coupled to the nozzle tip. Air and washer fluid may be selectively or simultaneously sprayed through the nozzle tip.

In still yet another further embodiment, the LiDAR-integrated spray nozzle may include an air connector fastened to the nozzle cover and configured to allow air to be introduced thereinto.

Other aspects and embodiments of the disclosure are discussed herein below.

It should be understood that the term "vehicle" or "vehicular" or other similar terms as used herein are inclusive of motor vehicles in general. Such motor vehicles may include passenger automobiles including sport utility vehicles (SUV), buses, trucks, various commercial vehicles, watercraft including a variety of boats and ships, aircraft, and the like. Such vehicles may also include hybrid vehicles, electric vehicles, plug-in hybrid electric vehicles, hydrogen-powered vehicles, and other alternative fuel vehicles (e.g. fuels derived from resources other than petroleum). As referred to herein, a hybrid vehicle is a vehicle that has two or more sources of power, for example, vehicles powered by both gasoline and electricity.

The above and other features of the disclosure are discussed herein below.

BRIEF DESCRIPTION OF THE DRAWINGS

The above and other features of the present disclosure are described in detail with reference to certain embodiments thereof illustrated in the accompanying drawings which are given hereinbelow by way of illustration only, and thus are not limitative of the present disclosure, and wherein.

Figure 1:
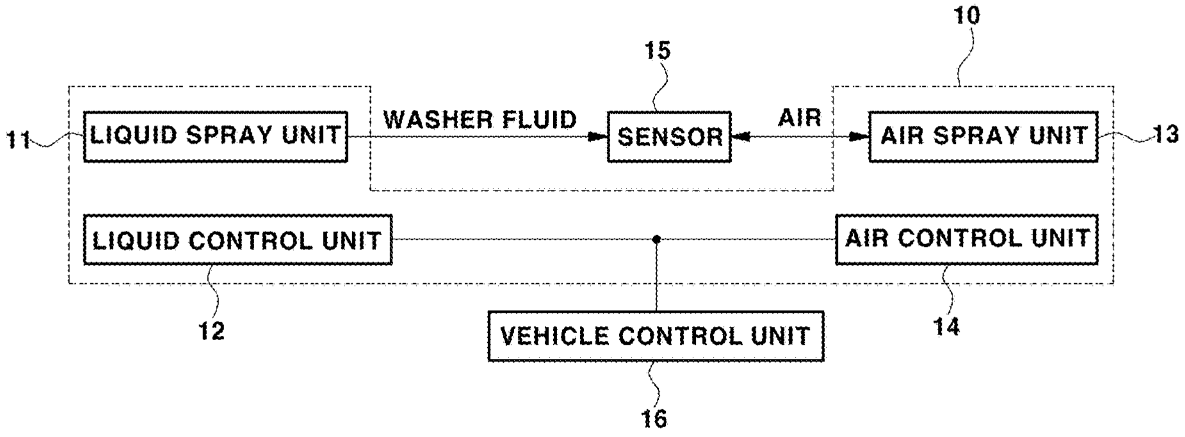
FIG. 1 is a diagram showing a configuration of a cleaning system for a vehicle sensor.

It should be understood that the appended drawings are not necessarily drawn to scale, presenting a somewhat simplified representation of various features illustrative of the basic principles of the disclosure. The specific design features of the present disclosure as disclosed herein, including, for example, specific dimensions, orientations, locations, and shapes, should be determined in part by the particular intended application and use environment.

In the figures, reference numbers refer to the same or equivalent parts of the present disclosure throughout the several figures of the drawing.

DETAILED DESCRIPTION

The present disclosure is described more fully hereinafter with reference to the accompanying drawings, in which various embodiments are shown. The examples, however, may be embodied in many different forms and should not be construed as being limited to the embodiments set forth herein. Rather, these embodiments are provided so that this disclosure is more thorough and complete, and can fully convey the scope of the disclosure to those having ordinary skill in the art.

The terms "-part", "-unit", and "-module" used in the specification mean units for processing at least two functions or operations, and can be implemented as hardware, software, or combinations of hardware and software.

The terminology used herein is for the purpose of describing particular embodiments only and is not intended to be limiting of embodiments of the disclosure. As used herein, the singular forms "a", "an", and "the" are intended to include the plural forms as well, unless the context clearly indicates otherwise.

Further, when a part is referred to as "including" or "having" another part, it is to be understood that it may further include other components, not excluding other components unless otherwise specifically indicated. In addition, the terms "-part", "-unit", and "-module" used in the specification mean units for processing at least two functions or operations.

Further, a controller may be implemented through a memory, which stores data on an algorithm for controlling operation of various components disposed in a vehicle or data on a program for executing the algorithm, and a processor, which executes the above operation using the data stored in the memory. In this case, the memory and the processor may be implemented as individual chips. Alternatively, the memory and the processor may be implemented as a single integrated chip. For example, the controller may include at least two of an electronic control unit (ECU), a central processing unit (CPU), a microprocessor unit (MPU), a microcontroller unit (MCU), an application processor (AP), or any type of processor well-known in the art of the present disclosure.

Further, the controller may be implemented as a combination of software and hardware capable of performing an operation on at least two applications or programs for executing a method according to embodiments of the present disclosure.

When a controller, component, device, element, part, unit, module, or the like of the present disclosure is described as having a purpose or performing an operation, function, or the like, the controller, component, device, element, part, unit, or module should be considered herein as being "configured to" meet that purpose or perform that operation or function. Each controller, component, device, element, part, unit, module, and the like may separately embody or be included with a processor and a memory, such as a non-transitory computer-readable media, as part of the apparatus.

Hereinafter, the embodiments are described in detail with reference to the accompanying drawings. In the description with reference to the accompanying drawings, the same or corresponding components are denoted by the same reference numerals, and duplicate descriptions thereof have been omitted.

FIG. 1 is a diagram showing an example of the overall structure of a cleaning device for a vehicle sensor 15.

Referring to FIG. 1, the cleaning device for the vehicle sensor 15 includes a liquid spray unit 11, a liquid control unit 12, an air spray unit 13, and an air control unit 14. Further, the cleaning device for the vehicle sensor 15 may be connected to a vehicle control unit 16. Each of the control units may be implemented as, for example, a microcontroller unit (MCU).

The liquid spray unit 11 sprays washer fluid to a measurement area of the sensor 15.

The washer fluid may contain various components depending on the embodiments. For example, the washer fluid may be general water or may contain the same component as that used to clean glass of the vehicle.

Further, the liquid spray unit 11 may simultaneously or sequentially spray washer fluid to a plurality of sensors 15 or may spray washer fluid only to a sensor 15 requiring cleaning.

The liquid control unit 12 receives a cleaning request from the vehicle control unit 16, and controls the spray of washer fluid by the liquid spray unit 11. When there is a cleaning request signal for the plurality of sensors 15, the liquid control unit 12 may perform control such that the washer fluid is sequentially or simultaneously sprayed to the plurality of sensors 15.

The air spray unit 13 sprays air stored in the vehicle to the measurement area of the sensor 15. Because there is a plurality of sensors 15 in the vehicle, the air spray unit 13 may simultaneously or sequentially spray air to the plurality of sensors 15 or may spray air only to a sensor 15 requiring cleaning. The air sprayed to the sensor 15 may be general air or compressed air. The air control unit 14 receives a cleaning request from the vehicle control unit 16, and controls spray of air by the air spray unit 13.

In one embodiment, the cleaning device for the vehicle sensor 15 receives a cleaning request from the vehicle control unit 16, and performs cleaning through spray of washer fluid and spray of air. Furthermore, spray of washer fluid and spray of air may be alternately performed in order to efficiently clean the sensor 15.

The air spray unit 13 may be configured to spray high-pressure air. To this end, the air spray unit 13 may include a compressor, an air tank, an air distributor, and a plurality of nozzles. High-pressure air may be compressed by the compressor, and may be stored in the air tank. The pressure of the air may be adjusted through the compressor.

The compressed air output from the air tank may be distributed to the plurality of nozzles through the air distributor. In this case, the high-pressure air may be sprayed to each of the sensors 15 through a corresponding one of the nozzles.

The air distributor performs on/off of each channel under the control of the air control unit 14. For example, when the air distributor receives an on command of a first channel from the air control unit 14, the air distributor outputs the compressed air from the air tank through the first channel, and a first nozzle, which is connected to the first channel via an air hose, sprays air to a first sensor 15. On/off of the channel may be controlled through a solenoid valve or the like.

The liquid spray unit 11 operates on the same principle as the air spray unit 13. The washer fluid may be pressurized through a washer pump, and the pressurized washer fluid may be stored in a washer fluid tank, and may be sprayed to the sensors 15 through the nozzles as needed.

Hereinafter, washer fluid and air spray operation of a cleaning device for cleaning a LiDAR 100 among the sensors 15 according to an embodiment of the present disclosure is described.

Figure 2:
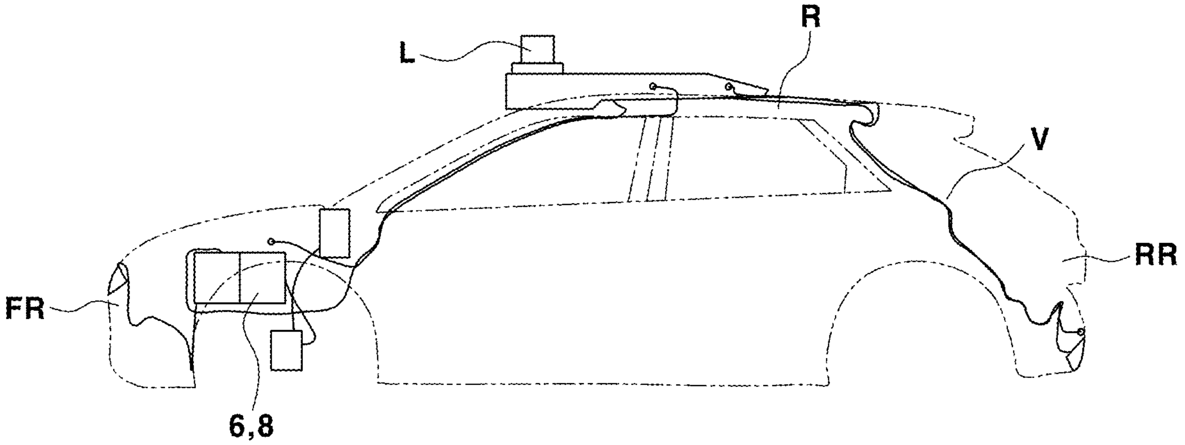
FIG. 2 is a view schematically showing the position of a light detection and ranging (LiDAR) mounted to a vehicle.

FIG. 2 is a view schematically showing the position of a LiDAR 100 mounted to the vehicle.

For example, the LiDAR 100 or L for a vehicle may be disposed on a front portion FR, a rear portion RR, a side surface, or a roof R of the vehicle V. The LiDAR 100 is configured to collect signals reflected from the surrounding environment while scanning a wide area during travel of the vehicle V. For this reason, the LiDAR 100 is in an open form exposed to the surrounding environment, and thus is likely to be exposed to more contaminated or polluted environments than other sensors 15. Specifically, when a range detected by the LiDAR 100 or L, i.e., the field of view thereof, is 180° or more (e.g., 180°, 240°, and the like), a large number of nozzles for spraying washer fluid or compressed air is desired in order to clean the LiDAR 100 or L.

Figure 3:
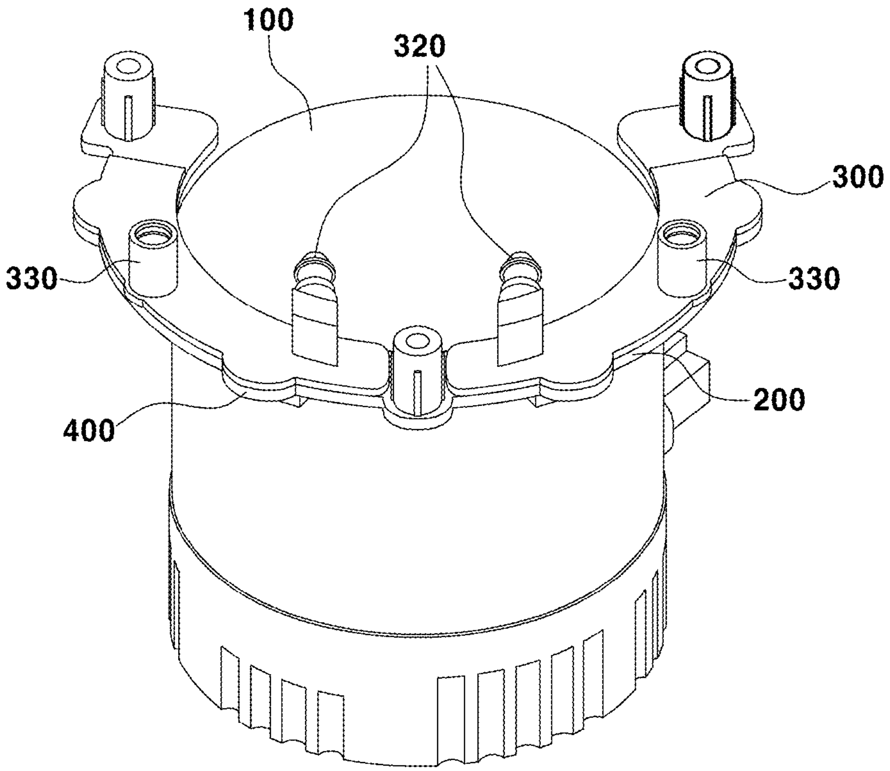
FIG. 3 is a perspective view showing the LiDAR assembled with a LiDAR-integrated spray nozzle according to an embodiment of the present disclosure.

FIG. 3 is a perspective view showing the LiDAR 100 assembled with the LiDAR-integrated spray nozzle.

In one embodiment of the present disclosure, the LiDAR-integrated spray nozzle may be attached to a column-type sensor. In particular, the column-type sensor may be the LiDAR 100.

The integrated spray nozzle is mounted to an upper portion of the LiDAR 100, and includes a housing 200, which has at least two flow path grooves 220 and a guide groove 210 formed therein. The integrated spray nozzle also includes: a nozzle cover 300, which includes a protrusion portion 310 inserted into the guide groove 210; an air connector 500, which is fastened to the upper surface of the nozzle cover 300 and into which air is introduced; and a nozzle tip 400, which is fastened to the lower portion of the housing 200 and through which air and washer fluid are selectively or simultaneously sprayed. In particular, the nozzle cover 300 may be configured to be fastened to the housing 200 while surrounding the upper surface of the housing 200.

In one embodiment of the present disclosure, the housing 200 is located at a region facing the upper end of the LiDAR 100, and is configured such that air and washer fluid sprayed through the nozzle tip 400 travel at a predetermined angle with respect to the lower end of the housing 200 in a height direction. Further, washer fluid and air may be selectively sprayed through the nozzle tip 400 to an area corresponding to the outer peripheral surface of the LiDAR 100, i.e., the sensing area of the LiDAR 100.

Further, the housing 200 may be positioned apart from the sensing portion of the column-type sensor. In particular, the sensing portion of the column-type sensor may be the outer peripheral surface of the LiDAR 100. The housing 200 may include a guide groove 210 and at least two flow path grooves. Furthermore, the housing 200 may include at least two guide grooves 210, and the protrusion portion 310 located on the lower surface of the nozzle cover 300 may be inserted into each of the guide grooves 210. Furthermore, the at least two flow path grooves may be located between the guide grooves 210, and the guide grooves 210 may be formed to completely surround the peripheral portion of the housing 200.

In addition, the guide groove 210 may have therein a welding groove 211 into which a part of the protrusion portion 310 of the nozzle cover 300 is inserted, and the protrusion portion 310 of the nozzle cover 300 may have a welding ridge 311 formed to be inserted into the welding groove 211.

The housing 200 and the nozzle cover 300 are fastened to each other through insertion of the protrusion portion 310 of the nozzle cover 300 into the guide groove 210 in the housing 200. In particular, the housing 200 and the nozzle cover 300 may be fastened to each other through insertion of the welding ridge 311 formed at the protrusion portion 310 into the welding groove 211 formed in the guide groove 210.

Further, when the housing 200 and the nozzle cover 300 are fastened to each other, the at least two flow path grooves 220 formed in the housing 200 may form flow paths. In particular, when the housing 200 and the nozzle cover 300 are fastened to each other, the upper sides of the flow path grooves 220 may be shielded by the nozzle cover 300. Accordingly, fluid may flow along the closed flow paths formed by the flow path grooves 220 and the nozzle cover 300.

Furthermore, when the upper sides of the at least two flow path grooves 220 formed in the housing 200 are shielded by the nozzle cover 300, the flow path grooves 220 may form at least one air flow path through which air flows and at least one washer fluid flow path through which washer fluid flows.

Furthermore, the housing 200 may include partition guides located between the guide grooves 210 and the flow path grooves. The at least two flow path grooves 220 may be independently isolated from each other by the partition guides. In particular, a single flow path groove may be located between the partition guides, and when the housing 200 and the nozzle cover 300 are fastened to each other, the upper surfaces of the partition guides may come into contact with the nozzle cover 300. Thus, the washer fluid flow path and the air flow path are formed so as to be sealed by the housing 200 and the nozzle cover 300.

The housing 200 may be formed in a cylindrical shape having one open end, and may include a portion to which the nozzle cover 300 is not fastened. In particular, the upper surfaces of both ends of the housing 200 may include areas to which the nozzle cover 300 is not fastened, and the central portion of the housing 200, which is located at the center of the housing 200 with respect to both ends of the housing 200 and is equidistant from both ends of the housing 200, may include an area to which the nozzle cover 300 is not fastened.

The central portion and both ends of the housing 200, to which the nozzle cover 300 is not fastened, may include fastening structures configured to be fastened to a vehicle body. In particular, in one embodiment of the present disclosure, the central portion and both ends of the housing 200 may include recesses formed therein in order to be integrally bolted to the vehicle body.

In addition, a washer fluid injection port 320 may be disposed on the upper surface of a portion of the nozzle cover 300 that is fastened to a portion of the housing 200 adjacent to the central portion of the housing 200. Additionally, an air injection port 330 may be disposed on the upper surface of a portion of the nozzle cover 300 that is fastened to a portion of the housing 200 adjacent to each of both ends of the housing 200. In particular, the air injection port 330 may be located between the washer fluid injection port 320 and the upper surface of a portion of the nozzle cover 300 contacting each of both ends of the housing 200.

In particular, two washer fluid injection ports 320 and two air injection ports 330 may be disposed on the nozzle cover 300. The washer fluid injection ports 320 may be arranged along the inner peripheral surface of the nozzle cover 300 adjacent to the LiDAR 100, and the air injection ports 330 may be arranged along the upper surface of the nozzle cover 300.

As such, since the air injection ports 330 and the washer fluid injection ports 320 are disposed on the upper surface of the nozzle cover 300, air and washer fluid may be sprayed from the upper end of the LiDAR 100 toward the lower end of the LiDAR 100 in a direction corresponding to the outer peripheral surface of the LiDAR 100. Further, as described above, since the washer fluid injection ports 320 are located on the nozzle cover 300, the washer fluid in the liquid state may easily flow toward the lower end of the LiDAR 100 along the upper surface of the LiDAR 100 due to gravity.

In addition, the housing 200 may include an air discharge port 230 and a washer fluid discharge port 240 through which air and washer fluid are discharged from the flow paths toward the nozzle tip 400. In particular, the air discharge port 230 and the washer fluid discharge port 240 may be arranged along the lower surface of the housing 200.

The nozzle tip 400, through which fluid having passed through the flow paths is discharged, may be mounted to the lower surface of the housing 200. In particular, a plurality of nozzle tips 400 may be disposed on the lower surface of the housing 200 in order to spray washer fluid and/or air to the entire area of the outer peripheral surface of the LiDAR 100.

Further, an end of the air flow path and an end of the washer fluid flow path are fastened to the nozzle tip 400. Accordingly, air and washer fluid may be selectively or simultaneously sprayed to the sensing area of the LiDAR 100.

Figure 4:
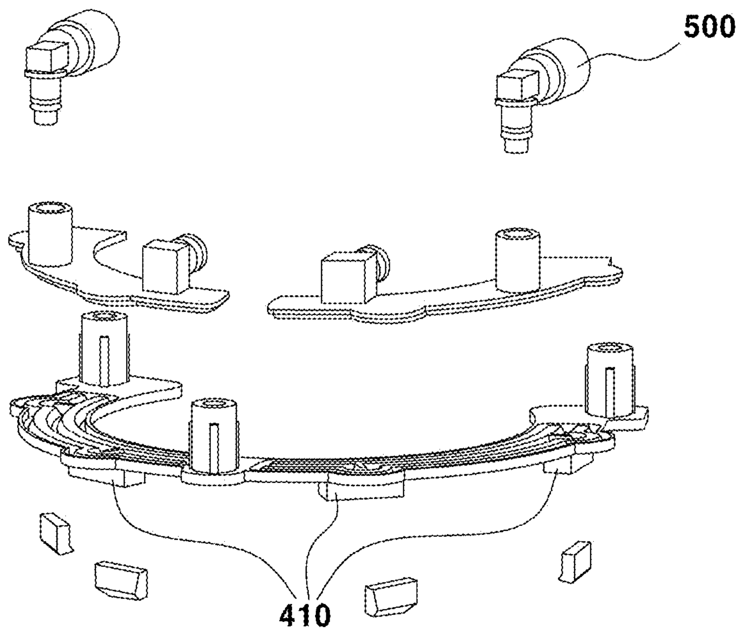
FIG. 4 is an exploded perspective view of the LiDAR-integrated spray nozzle according to an embodiment of the present disclosure.
Figure 5:
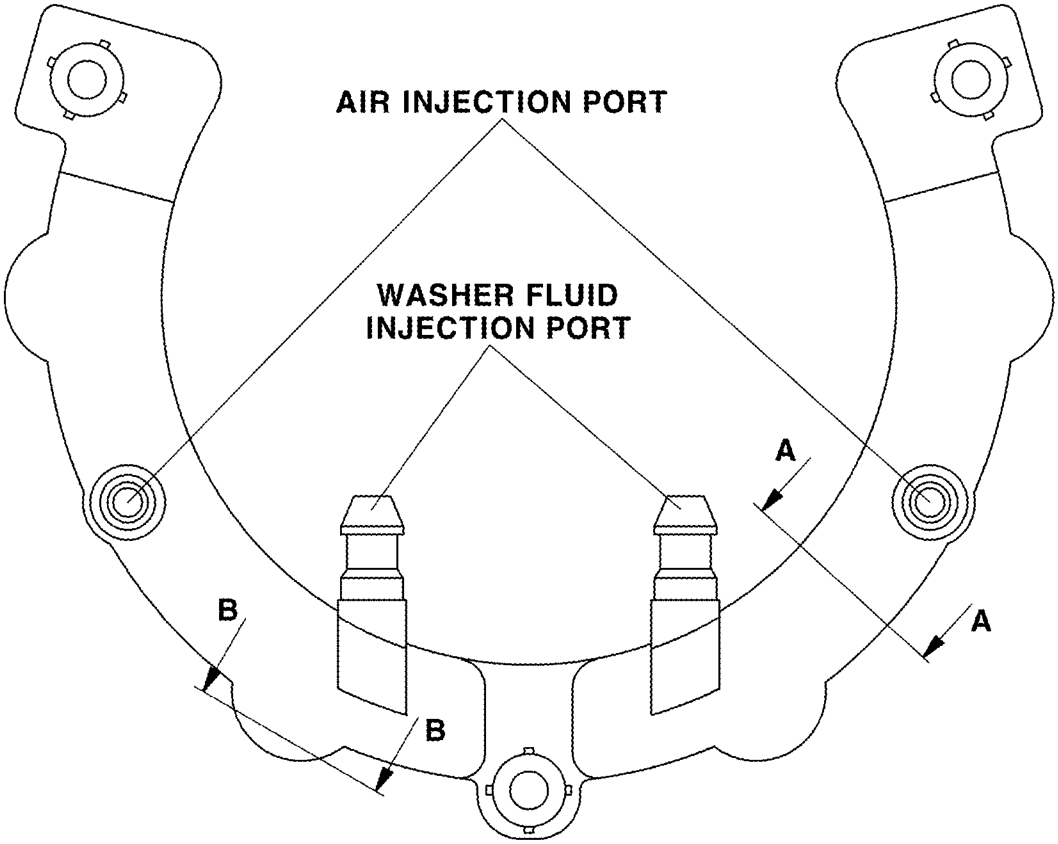
FIG. 5 is a plan view of the LiDAR-integrated spray nozzle according to an embodiment of the present disclosure.

FIG. 4 is an exploded perspective view of the integrated spray nozzle, and FIG. 5 is a plan view of the integrated spray nozzle.

In one embodiment of the present disclosure, as shown in FIG. 4, the nozzle tip 400 may be fastened to the lower surface of the housing 200, the nozzle cover 300 may be fastened to the upper surface of the housing 200, and the air connector 500, into which air is introduced, may be mounted to the upper surface of the nozzle cover 300. In particular, the air connector 500 may be connected to the air injection port 330 located on the upper surface of the nozzle cover 300, and may be in fluid connection with the air flow path formed by the nozzle cover 300 and the housing 200 fastened to each other.

In addition, the housing 200 may include a tip fastening portion 410 formed on the lower surface thereof to allow the nozzle tip 400 to be fastened thereto. The tip fastening portion may be disposed between both ends of the housing 200 and the central portion of the housing 200. In particular, two tip fastening portions may be disposed at a predetermined interval between one end of the housing 200 and the central portion of the housing 200. The two tip fastening portions may be disposed at a predetermined interval between the other end of the housing 200 and the central portion of the housing 200. In particular, four tip fastening portions may be disposed at regular intervals along the lower surface of the housing 200. Further, the tip fastening portions may protrude toward the lower side of the LiDAR 100. In particular, the air discharge port 230 and the washer fluid discharge port 240 may be located at each of the tip fastening portions.

The nozzle tips 400 may be inserted into each tip fastening portion, with the quantity of nozzle tips matching the number of fastening portions. In particular, if there are four tip fastening portions, then there are four nozzle tips 400. The washer fluid injection port 320 may be located on the upper surface of the nozzle cover 300, and may protrude from the upper surface of the nozzle cover 300 so as to be oriented toward the LiDAR 100. In addition, the air injection port 330 may protrude from the upper surface of the nozzle cover 300 so as to be oriented in a direction perpendicular to the upper end of the LiDAR 100.

Further, one end of the air connector 500, which is fastened to the air injection port 330 and is in fluid connection with the air flow path, may be inserted into the air injection port 330 in a direction perpendicular to the upper end of the LiDAR 100, and the other end of the air connector 500 may be oriented in a direction parallel to the upper end of the LiDAR 100.

As shown in FIG. 5, the housing 200 has a cylindrical shape with one open end, which is spaced a predetermined distance from the LiDAR 100, and nozzle covers 300 are located at both ends of the housing 200, relative to its central portion. In particular, two nozzle covers 300 may be positioned on the left and right sides of the housing 200 with respect to the central portion of the housing 200. Further, the nozzle covers 300 are disposed on both sides of the housing 200 with respect to the central portion of the housing 200 while having a shape corresponding to the shape of the housing 200.

The central portion and both ends of the housing 200 that are not fastened to the nozzle covers 300 may protrude in the outward direction of the LiDAR 100. Further, a mounting portion, which protrudes in a direction perpendicular to the upper end of the LiDAR 100, may be located on each of the central portion and both ends of the housing 200 that are not fastened to the nozzle covers 300. In particular, the mounting portion may be located on the protruding portion of each of the central portion and both ends of the housing 200 in order to avoid interference with the washer fluid injection port 320 and the air injection port 330. In particular, the LiDAR-integrated spray nozzle may be fastened to the vehicle through the mounting portion of the housing 200.

Figure 6:
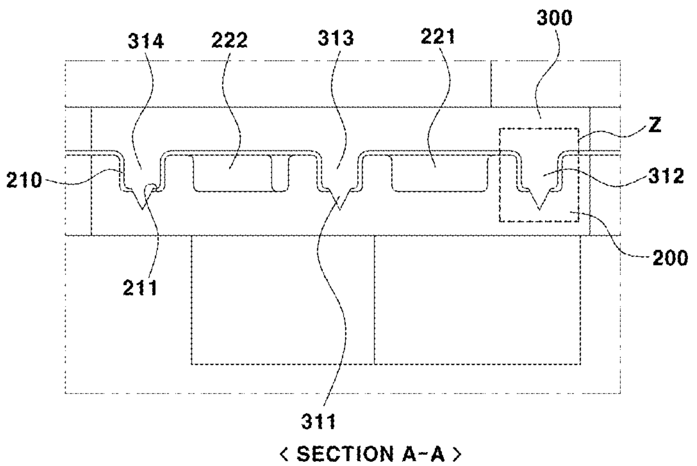
FIG. 6 is a cross-sectional view taken along line A-A in the LiDAR-integrated spray nozzle shown in FIG. 5.

FIG. 6 is a cross-sectional view taken along line A-A in the LiDAR-integrated spray nozzle shown in FIG. 5.

In one embodiment of the present disclosure, the welding ridge 311 formed at the protrusion portion 310 of the nozzle cover 300 is inserted into the welding groove 211 formed in the guide groove 210, whereby the housing 200 and the nozzle cover 300 are fastened to each other. Further, the welding groove 211 may be formed in a shape corresponding to the shape of the welding ridge 311. In particular, the welding ridge 311 may be formed to have a triangular, semicircular, or rectangular cross-sectional shape. Furthermore, the housing 200 and the nozzle cover 300 may be fastened to each other through ultrasonic welding.

The protrusion portion 310 located on the lower surface of the nozzle cover 300 may include: a first protrusion 312, which is located close to the inner peripheral surface of the nozzle cover 300 that is in contact with the inner peripheral surface of the housing 200 mounted to the LiDAR 100; a third protrusion 314, which is located far from the inner peripheral surface of the nozzle cover 300; and a second protrusion 313, which is located between the first protrusion 312 and the third protrusion 314 and is equidistant from the first protrusion 312 and the third protrusion 314. In other words, among the first to third protrusions 312, 313, and 314, the first protrusion 312 may be located closest to the LiDAR 100, and the third protrusion 314 may be located farthest from the LiDAR 100.

The partition guides, which are located between the guide grooves 210 and the flow path grooves, may include: a first partition guide, which is adjacent to the first protrusion 312 and a first flow path groove 221; and a second partition guide, which is adjacent to the second protrusion 313 and the first flow path groove 221. When the protrusion portion 310 is fastened to the guide groove 210, the upper surfaces of the first partition guide and the second partition guide may come into contact with the nozzle cover 300. Thus, the first flow path groove 221 may be sealed to form a washer fluid flow path.

In addition, the partition guides may include: a third partition guide, which is adjacent to the second protrusion 313 and a second flow path groove 222; and a fourth partition guide, which is adjacent to the third protrusion 314 and the second flow path groove 222. When the protrusion portion 310 is fastened to the guide groove 210, the upper surfaces of the third partition guide and the fourth partition guide may come into contact with the nozzle cover 300. Thus, the second flow path groove 222 may be sealed to form an air flow path.

Figure 7:
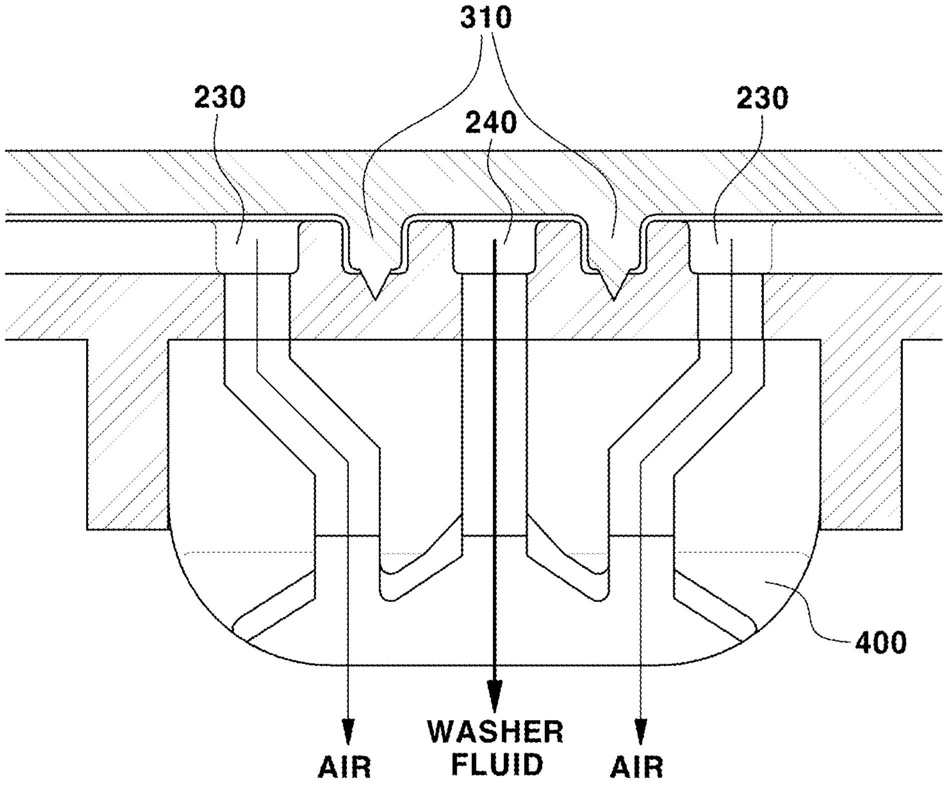
FIG. 7 is an enlarged view taken along line B-B in the LiDAR-integrated spray nozzle shown in FIG. 5 and shows a state in which a nozzle tip is fastened to a housing according to an embodiment of the present disclosure.

FIG. 7 is an enlarged view showing a state in which the nozzle tip 400 is fastened to the housing 200. In particular, FIG. 7 is an enlarged view taken along line B-B in the LiDAR-integrated spray nozzle shown in FIG. 5.

In one embodiment of the present disclosure, the nozzle tip 400 is fastened to the tip fastening portion located on the rear surface of the housing 200. Further, a portion of the washer fluid discharge port 240 and a portion of the air discharge port 230 may be included in the tip fastening portion. The nozzle tip 400 may be fastened to the tip fastening portion to be connected to ends of the washer fluid discharge port 240 and the air discharge port 230. Furthermore, the nozzle tip 400 may be configured to be connected to one washer fluid discharge port 240 and two air discharge ports 230. In particular, two air discharge ports 230 and one washer fluid discharge port 240 may be disposed at regular intervals with the washer fluid discharge port 240 interposed between the air discharge ports 230.

Front ends of the air discharge port 230 and the washer fluid discharge port 240 may be defined as portions adjacent to the upper surface of the housing 200, and rear ends of the air discharge port 230 and the washer fluid discharge port 240 may be defined as portions adjacent to the lower surface of the housing 200.

The ends of the air discharge port 230 and the washer fluid discharge port 240 may be formed in a straight shape for simultaneous spray of air and washer fluid. In particular, the washer fluid discharge port 240 may be formed to extend straight from the front end thereof to the rear end thereof. Further, the rear end of the air discharge port 230 may be located adjacent to the rear end of the washer fluid discharge port 240. In particular, the air discharge port 230 may be formed such that a portion between the front end thereof and the rear end thereof is bent toward the washer fluid discharge port 240.

When washer fluid is sprayed from the washer fluid discharge port 240, the spray speed of the washer fluid may increase under the influence of high-pressure air that is sprayed from the air discharge port 230.

The nozzle tip 400 may serve to adjust and stabilize the flow of fluid at a point at which a plurality of flow paths is connected to one another. Further, the nozzle tip 400 may serve to adjust the pressure and flow rate of fluid to ensure efficient operation, and may also serve to adjust the direction of fluid to induce the flow of fluid in a desired direction. In particular, the nozzle tip 400 may be configured to allow fluid to flow in a direction from the upper end of the LiDAR 100 toward the lower end of the LiDAR 100.

Figure 8A:
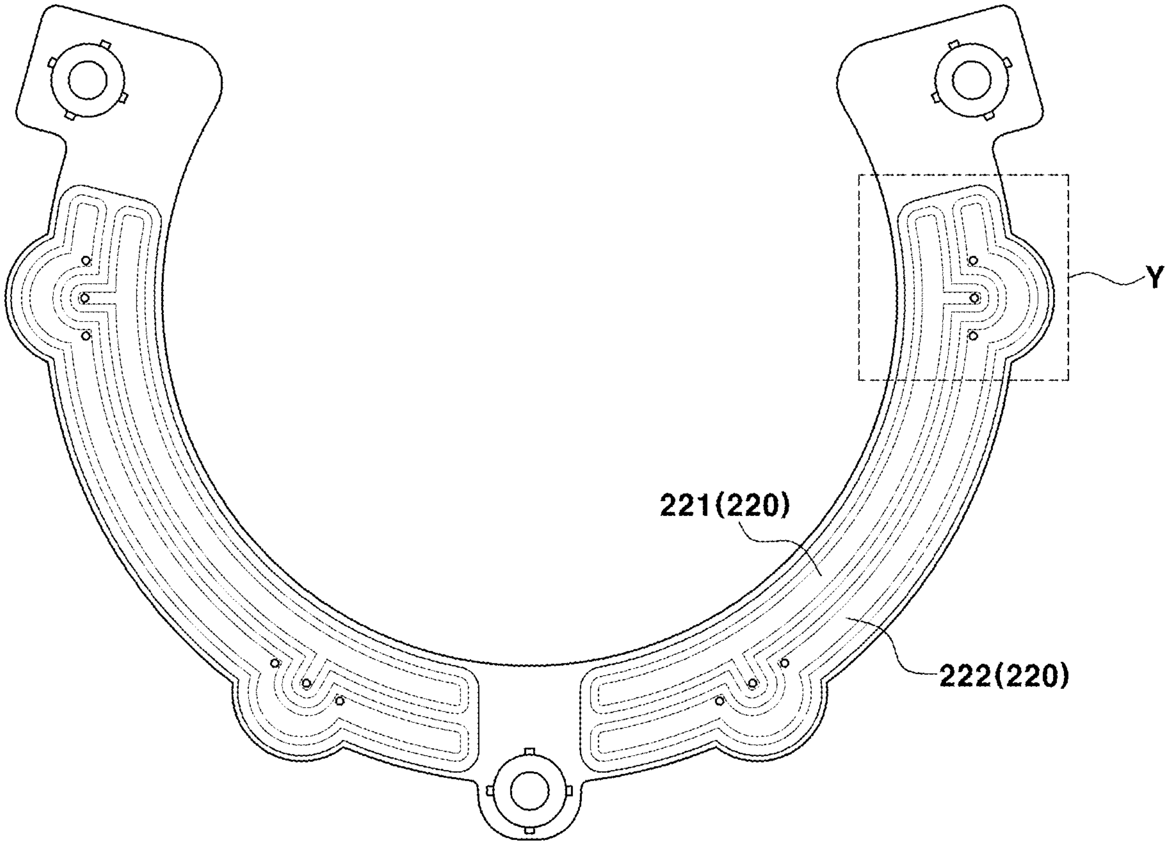
FIG. 8A is a plan view of a housing according to an embodiment of the present disclosure.
Figure 8B:
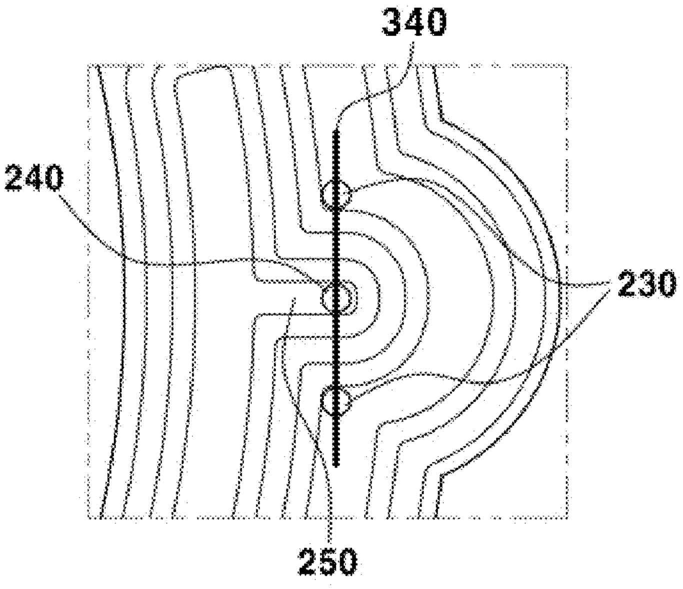
FIG. 8B is an enlarged plan view showing a portion of a housing at which a washer fluid discharge port and an air discharge port are located according to an embodiment of the present disclosure.

FIG. 8A is a plan view of the housing 200, and FIG. 8B is an enlarged plan view showing a portion of the housing 200 at which the air discharge port 230 and the washer fluid discharge port 240 are located.

In one embodiment of the present disclosure, in order to maintain gentle flow of fluid and thus to minimize a vortex in the housing 200, the nozzle cover 300 may include at least two washer fluid injection ports 320 and at least two air injection ports 330 located on the upper surface thereof. Further, the housing 200 may include at least two flow path grooves formed in each of the left and right sides thereof with respect to the central portion thereof. Furthermore, the flow path grooves may be disposed in bilateral symmetry with respect to the central portion of the housing 200. In particular, the housing 200 may include at least two air flow paths and at least two washer fluid flow paths.

In addition, the semicircular portion of the housing 200 may include a protruding portion 250 extending outwardly from the first flow path groove 221, and may include a curved portion extending outwardly from the second flow path groove 222. In particular, the curved portion may include a shape having a predetermined radius based on an end of the protruding portion 250.

In the right side of the housing 200 with respect to the central portion thereof, the first flow path groove 221 may be located close to the inner peripheral surface of the housing 200 that is mounted to the LiDAR 100, and the second flow path groove 222 may be located far from the inner peripheral surface of the housing 200. In addition, at least one washer fluid discharge port 240 may be located in the first flow path groove 221, and at least two air discharge ports 230 may be located in the second flow path groove 222.

In particular, as shown in FIG. 8B, one washer fluid discharge port 240 may be located on an imaginary line 340 interconnecting two air discharge ports 230. Further, the washer fluid discharge port 240 may be located in the protruding portion 250 extending outwardly from the first flow path groove 221.

Furthermore, one washer fluid discharge port 240 and two air discharge ports 230 may be connected to one nozzle tip 400. The number of nozzle tips 400 may be varied depending on the number of washer fluid discharge ports 240 and the number of air discharge ports 230. Furthermore, the left side of the housing 200 with respect to the central portion thereof may have the same configuration as the right side thereof.

It should be apparent from the above description, that the present disclosure may obtain the following effects through the above embodiments and through the configuration, combination, and use relationship described above.

First, since washer fluid and air are used together, it may be possible to more effectively remove foreign substances adhered to a surface of a sensor.

Second, when washer fluid and air are used together to remove foreign substances, the amount of washer fluid used may be reduced compared to when only washer fluid is used for cleaning. Accordingly, it may be possible to obtain an economical effect such as reduction in maintenance cost.

The detailed description is illustrative of the present disclosure. Also, the above description is intended to illustrate and explain embodiments of the present disclosure, and the present disclosure may be implemented in various other combinations, modifications, and environments. In other words, the present disclosure may be changed or modified within the scope of the concept of the disclosure disclosed herein, within the equivalent scope of the disclosure, and/or within the skill and knowledge of the art. The described embodiments illustrate the best state of the art to implement the technical idea of the present disclosure, and various changes may be made thereto as demanded for specific applications and uses of the present disclosure. Accordingly, the detailed description is not intended to limit the present disclosure to the embodiments. Also, the appended claims should be construed as encompassing such other embodiments.

What is claimed is:

1. A light detection and ranging (LiDAR)-integrated spray nozzle comprising:
- a column-type sensor;
- a housing spaced apart from a sensing portion of the column-type sensor, the housing including a guide groove and at least two flow path grooves formed therein;
- a nozzle cover configured to surround an upper surface of the housing, the nozzle cover including a protrusion portion inserted into the guide groove; and
- a nozzle tip disposed at a fluid discharge port provided at the housing,
- wherein, when the protrusion portion is inserted into the guide groove to couple the nozzle cover to the housing, the at least two flow path grooves are sealed to form flow paths.

2. The LiDAR-integrated spray nozzle of claim 1, wherein the guide groove is configured to surround the at least two flow path grooves, and
- wherein the protrusion portion is located at the nozzle cover so as to correspond to the guide groove.

3. The LiDAR-integrated spray nozzle of claim 1, comprising:
- a welding groove formed in the guide groove to allow a part of the protrusion portion to be inserted thereinto; and
- a welding ridge formed on a lower surface of the protrusion portion to be inserted into the welding groove in the guide groove.

4. The LiDAR-integrated spray nozzle of claim 1, wherein the protrusion portion comprises:
- a first protrusion located on a lower surface of the nozzle cover at a position adjacent to the column-type sensor;
- a second protrusion spaced a predetermined distance from the first protrusion; and
- a third protrusion spaced a predetermined distance from the second protrusion.

5. The LiDAR-integrated spray nozzle of claim 4, wherein the at least two flow path grooves comprise:
- a first flow path groove located between the first protrusion and the second protrusion; and
- a second flow path groove located between the second protrusion and the third protrusion.

6. The LiDAR-integrated spray nozzle of claim 1, wherein the nozzle cover comprises:
- a washer fluid injection port configured to allow washer fluid to be introduced thereinto; and
- an air injection port configured to allow air to be introduced thereinto.

7. The LiDAR-integrated spray nozzle of claim 6, wherein a first flow path groove is configured to be in fluid connection with the washer fluid injection port, and
- wherein a second flow path groove is configured to be in fluid connection with the air injection port.

8. The LiDAR-integrated spray nozzle of claim 7, comprising:
- two air discharge ports located in the second flow path groove; and a washer fluid discharge port located in the first flow path groove, wherein the washer fluid discharge port is located on an imaginary line interconnecting the two air discharge ports.

9. The LiDAR-integrated spray nozzle of claim 8, wherein the washer fluid discharge port is located in a protruding portion extending outwardly from the first flow path groove.

10. The LiDAR-integrated spray nozzle of claim 8, wherein the two air discharge ports and the washer fluid discharge port are coupled to the nozzle tip, and wherein air and washer fluid are selectively or simultaneously sprayed through the nozzle tip.

11. The LiDAR-integrated spray nozzle of claim 1, comprising an air connector fastened to the nozzle cover, wherein the air connector is configured to allow air to be introduced thereinto.

* * * * *